(12) United States Patent
Kwilinski

(10) Patent No.: US 7,533,938 B2
(45) Date of Patent: May 19, 2009

(54) SEAT COMFORT DEVICE, AND METHODS OF CONSTRUCTING AND UTILIZING SAME

(76) Inventor: Rebecca Kwilinski, 2172 N. Huron Rd., Harrisville, MI (US) 48740

( * ) Notice: Subject to any disclaimer, the term of this patent is extended or adjusted under 35 U.S.C. 154(b) by 101 days.

(21) Appl. No.: 11/306,004

(22) Filed: Dec. 14, 2005

(65) Prior Publication Data

US 2007/0132298 A1   Jun. 14, 2007

(51) Int. Cl.
*A47C 7/36* (2006.01)
*A47C 20/00* (2006.01)

(52) U.S. Cl. ............................. 297/397; 5/636
(58) Field of Classification Search .................. 297/397; 5/636, 640, 653
See application file for complete search history.

(56) References Cited

U.S. PATENT DOCUMENTS

| | | | |
|---|---|---|---|
| 2,765,480 A * | 10/1956 | Mueller ........................ 5/636 |
| 3,761,131 A * | 9/1973 | Oliver ......................... 5/652 X |
| 4,274,673 A * | 6/1981 | Kifferstein ................... 297/220 |
| 5,332,292 A | 7/1994 | Price et al. |
| 5,567,015 A * | 10/1996 | Arias ...................... 297/397 X |
| 5,916,089 A | 6/1999 | Ive |
| 6,122,784 A * | 9/2000 | Hurwitz ....................... 5/636 X |
| 6,640,366 B1 * | 11/2003 | Draves .......................... 5/630 |
| 6,793,287 B2 | 9/2004 | Dunk |
| D509,694 S * | 9/2005 | Pitchford ................. D6/601 X |
| 6,971,715 B2 * | 12/2005 | Hankins ................ 297/219.11 |

* cited by examiner

*Primary Examiner*—Anthony D Barfield
(74) *Attorney, Agent, or Firm*—Weiner & Burt, P.C.; Irving M. Weiner; Pamela S. Burt

(57) ABSTRACT

A seat comfort device to make it comfortable for children to ride in cars and/or to use with booster or child safety seats. Both sides of the device are provided with pillows for resting the user's head, and to prevent the child from falling over when the child is asleep.

8 Claims, 1 Drawing Sheet

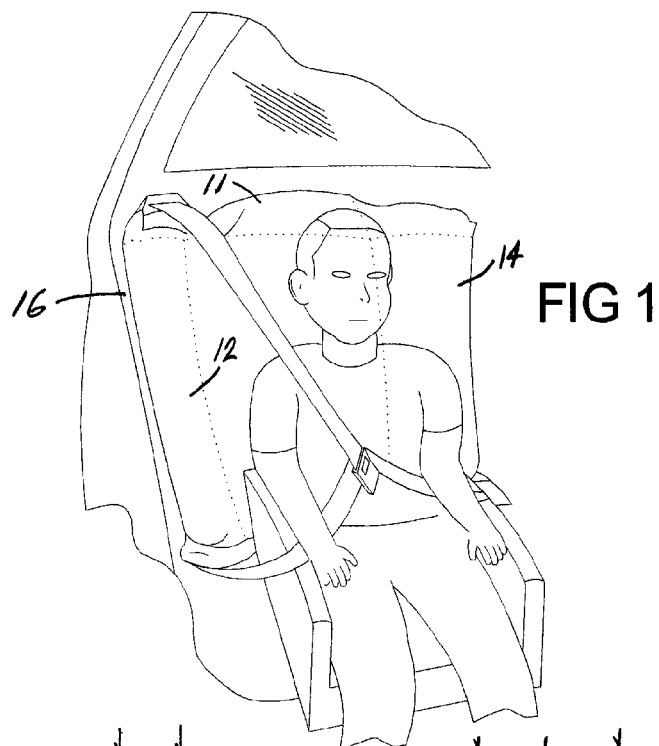
FIG 1
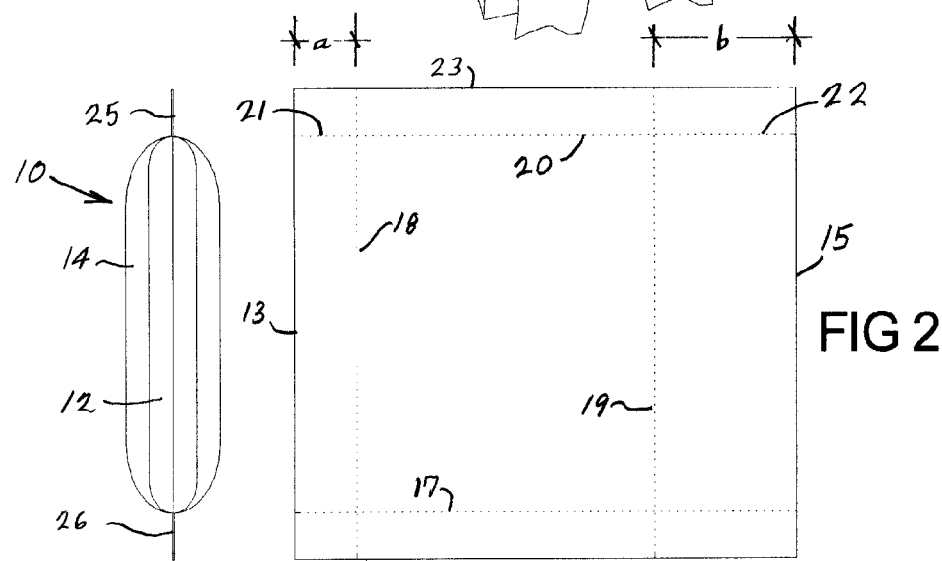
FIG 2
FIG 3
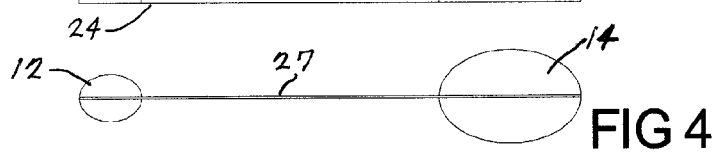
FIG 4

SEAT COMFORT DEVICE, AND METHODS OF CONSTRUCTING AND UTILIZING SAME

The present invention relates generally to a novel and unique seat comfort device, and methods of constructing and utilizing same.

More particularly, the present invention relates to a seat comfort device which is provided with different sized pillows vertically arranged on each side of the device.

BACKGROUND OF THE INVENTION

The prior, but not necessarily relevant, art is exemplified by: Price et al U.S. Pat. No. 5,332,292 entitled "PORTABLE PROTECTIVE CUSHION ARRANGEMENT FOR A TODDLER'S CAR SEAT"; Ive U.S. Pat. No. 5,916,089 entitled "SUPPORT ARTICLE FOR USE WITH INFANT CARRIER DEVICE"; and Dunk U.S. Pat. No. 6,793,287 entitled "BOOSTER SEAT HEAD REST".

It is a desideratum of the present invention to avoid the animadversions of the conventional prior art devices and techniques, and to achieve a one-piece seat comfort device which is made completely from fabric material, stuffing and stitch sewn.

SUMMARY OF THE INVENTION

The present invention provides a seat comfort device, comprising: a main fabric assembly; a substantially vertical first pillow integral with said main fabric assembly, and disposed near a first end of said main fabric assembly; a substantially vertical second pillow integral with said main fabric assembly, and disposed near a second end of said main fabric assembly; said first end of said main fabric assembly is remote from said second end of said main fabric assembly; said substantially vertical first pillow has a first predetermined width; said substantially vertical second pillow has second predetermined width; said first predetermined width of said substantially first pillow is less than said second predetermined width of said substantially vertical second pillow; and said seat comfort device comprises a one-piece unit which is designed, dimensioned and shaped to be placed between an external seat and the back of a user of said seat comfort device.

It is a primary object of the present invention to provide a novel and unique seat comfort device as described hereinabove to make it comfortable for children who use booster seats.

It is a further object of the present invention to provide a novel and unique seat comfort device as described hereinabove, wherein the seat comfort device comprises a one-piece item which is adapted to be placed behind a booster seat or child safety seat.

Another object of the present invention is to provide a novel and unique seat comfort device as described hereinabove, wherein the seat comfort device is provided on both sides with pillows for a child or an adult to rest his or her head on.

Yet a further object of the present invention is to provide a novel and unique seat comfort device as described hereinabove, wherein the seat cover device is provided on one side thereof (the seatbelt side) with a small pillow, and which is provided on the other side thereof with a much larger pillow.

An additional object of the present invention is to provide a novel and unique seat comfort device as described hereinabove, wherein the smaller pillow of the seat comfort device does not interfere with or adversely affect the operation of a conventional auto seatbelt.

An additional object of the present invention is to provide a novel and unique seat comfort device as described hereinabove, wherein the seat comfort device is reversible for left or right side use in an automobile.

A further object of the present invention is to provide a novel and unique seat comfort device as described hereinabove, wherein the seat comfort device prevents the child or adult user from falling over when the user falls asleep.

Another object of the present invention is to provide a novel and unique seat comfort device as described hereinabove, wherein the seat comfort device keeps the user from falling over when they fall asleep, and thus safer because of the relatively upright position of the user in the seat comfort device.

A further object of the present invention is to provide a novel and unique seat comfort device as described hereinabove, wherein the seat comfort device although designed for use with a booster or child safety seat, can be used without a booster or child safety seat.

The foregoing objects, features and advantages of the present invention will become readily apparent to those persons skilled in this particular area of technology and to other persons after having been exposed to the following patent specification when read in conjunction with the accompanying patent drawings.

BRIEF DESCRIPTION OF THE DRAWINGS

FIG. 1 is a perspective view of a preferred embodiment of the present invention in use with an automobile car seatbelt.

FIG. 2 is a front elevational view of the FIG. 1 embodiment.

FIG. 3 is a right-side elevational view of the device shown in FIG. 2.

FIG. 4 is a top plan view of the FIG. 2 device.

DETAILED DESCRIPTION OF THE INVENTION

With reference to FIGS. 1-4 there is illustrated a novel and unique seat comfort device 10 in accordance with a preferred embodiment of the present invention.

The seat comfort device 10 includes a main fabric assembly 11.

A substantially vertical first pillow 12 is integral with the main fabric assembly 11, and is disposed near a first end 13 of the main fabric assembly 11.

A substantially vertical second pillow 14 is integral with the main fabric assembly 11, and is disposed near a second end 15 of the main fabric assembly 11.

The first end 13 of the main fabric assembly 11 is remote from the second end 15 of the main fabric assembly 11.

The substantially vertical first pillow 12 has a first predetermined width "a".

The substantially vertical second pillow 14 has a second predetermined width "b".

The first predetermined "a" width is less than the second predetermined "b" width.

It is important to note that the seat comfort device 10 in accordance with the present invention comprises a one-piece unit which is designed, dimensioned and shaped to be placed between an external seat, such as, for example, an automotive seat 16, and the back of the user, such as a child, of the seat comfort device 10.

Preferably, but not necessarily, the seat comfort device 10 can be fabricated from material which is 66 inches long and 36 inches wide.

From such material, the first step would be to hem the rough ends. The next step would be to turn the item inside out, and to sew the sides together. Thereafter, the item should be turned right side out. The smaller pillow 12 would have a width "a" of approximately 6 inches, and the larger pillow 14 would have a width "b" of approximately 10 inches.

As shown in FIG. 2, the various stitch lines 17, 18, 19 and 20 are sewn.

Before the stitch lines 21 and 22 are sewn, the pillows 12 and 14 are stuffed with stuffing. Thereafter, the stitch lines 21 and 22 are sewn.

This procedure results in a seat comfort device 10 which is approximately 34 inches by 32 inches.

It should be noted that the preferred embodiment results in two pillows 12 and 14 which are separated from the top and bottom ends 23 and 24, respectively, of the seat comfort device 10 by four-inch flat portions 25 and 26. The center portion 27 is substantially flat also.

From the foregoing, it can be seen that the entire seat comfort device 10 is fabricated as a one-piece device from fabric material, stuffing, and sewed stitch lines 17, 18, 19, 20, 21 and 22, and has no hard or rigid portions thereof.

Accordingly, the seat comfort device 10, when not in use, can be rolled up for storage.

There has been illustrated in the accompanying drawings and described hereinabove only one unique and novel embodiment of the present invention which can be practiced and constructed in many different configurations, arrangements of components, sizes, and shapes.

It should be understood that many changes, modifications, variations, and other uses and applications will become apparent to those persons skilled in this particular area of technology and to others after having been exposed to the present patent specification and accompanying drawings.

Any and all such changes, modifications, variations and other uses and applications which do not depart from the spirit and scope of the present invention are therefore covered by and embraced within the present invention and the patent claims set forth hereinbelow.

What is claimed is:

1. A seat comfort device, comprising:

a one-piece substantially square-shaped main fabric assembly having a top horizontal outer edge, a vertical right side outer edge, a bottom horizontal outer edge, and a vertical left side outer edge;

an upper horizontal stitch line disposed on said one-piece substantially square-shaped main fabric assembly and disposed parallel to and commensurate with said top horizontal outer edge at a predetermined distance from said top horizontal outer edge;

a first substantially flat rectangular portion of said one-piece substantially square-shaped main fabric assembly having a perimeter formed by said top horizontal outer edge, an upper portion of said vertical right side outer edge, said upper horizontal stitch line, and an upper portion of said vertical left side outer edge;

a lower horizontal stitch line disposed on said one-piece substantially square-shaped main fabric assembly and disposed parallel to and commensurate with said bottom horizontal outer edge at a predetermined distance from said bottom horizontal outer edge;

a second substantially flat rectangular portion of said one-piece substantially square-shaped main fabric assembly having a perimeter formed by said lower horizontal stitch line, a lower portion of said vertical right side outer edge, said bottom horizontal outer edge, and a lower portion of said vertical left side outer edge;

a left vertical stitch line disposed on said one-piece substantially square-shaped main fabric assembly and disposed parallel to and commensurate with said vertical left side outer edge at a predetermined distance from said vertical left side outer edge;

a right vertical stitch line disposed on said one-piece substantially square-shaped main fabric assembly and disposed parallel to and commensurate with said vertical right side outer edge at a predetermined distance from said vertical right outer edge;

a substantially rectangular-shaped substantially flat central portion of said one-piece substantially square-shaped main fabric having a perimeter formed by a central major portion of said upper horizontal stitch line, a central major portion of said right vertical stitch line, a central major portion of said lower horizontal stitch line, and a central major portion of said left vertical stitch line;

said one-piece substantially square-shaped main fabric assembly including first and second pillows;

said first pillow having a perimeter formed by a left portion of said upper horizontal stitch line, said central major portion of said left vertical stitch line, a left portion of said lower horizontal stitch line, and a central major portion of said vertical left side outer edge; and said second pillow having a perimeter formed by a right portion of said upper horizontal stitch line, a central major portion of said vertical right side outer edge, a right portion of said lower horizontal stitch line, and said central major portion of said right vertical stitch line;

said first pillow is surrounded on three, and only three, of its sides with substantially flat portions of said one-piece substantially square-shaped main fabric assembly; and said second pillow is surrounded on three, and only three, of its sides with substantially flat portions of said one-piece substantially square-shaped main fabric assembly.

2. A seat comfort device according to claim 1, wherein:

said seat comfort device is designed, dimensioned and shaped to be placed between an automobile seat and the back of a user of said seat comfort device;

said seat comfort device is designed to be oriented so that an upper portion of said first and second pillows is disposed adjacent an upper portion of an automobile seatbelt;

said first and second pillows are designed, dimensioned, and shaped so as not to interfere with the operation of said automobile seatbelt;

said seat comfort device is adapted to be rolled up for storage when not in use; and said seat comfort device is reversible for left or right side use relative to the automobile seat.

3. A seat comfort device, comprising:

a one-piece substantially square-shaped main fabric assembly having a top horizontal outer edge, a vertical right side outer edge, a bottom horizontal outer edge, and a vertical left side outer edge;

an upper horizontal stitch line disposed on said one-piece substantially square-shaped main fabric assembly and disposed parallel to and commensurate with said top horizontal outer edge at a predetermined distance from said top horizontal outer edge;

a first substantially flat rectangular portion of said one-piece substantially square-shaped main fabric assembly having a perimeter formed by said top horizontal outer edge, an upper portion of said vertical right side outer edge, said upper horizontal stitch line, and an upper portion of said vertical left side outer edge;

a lower horizontal stitch line disposed on said one-piece substantially square-shaped main fabric assembly and disposed parallel to and commensurate with said bottom horizontal outer edge at a predetermined distance from said bottom horizontal outer edge;

a second substantially flat rectangular portion of said one-piece substantially square-shaped main fabric assembly having a perimeter formed by said lower horizontal stitch line, a lower portion of said vertical right side outer edge, said bottom horizontal outer edge, and a lower portion of said vertical left side outer edge;

a left vertical stitch line disposed on said one-piece substantially square-shaped main fabric assembly and disposed parallel to and commensurate with said vertical left side outer edge at a predetermined distance from said vertical left side outer edge;

a right vertical stitch line disposed on said one-piece substantially square-shaped main fabric assembly and disposed parallel to and commensurate with said vertical right side outer edge at a predetermined distance from said vertical right outer edge;

a substantially rectangular-shaped substantially flat central portion of said one-piece substantially square-shaped main fabric having a perimeter formed by a central major portion of said upper horizontal stitch line, a central major portion of said right vertical stitch line, a central major portion of said lower horizontal stitch line, and a central major portion of said left vertical stitch line;

said one-piece substantially square-shaped main fabric assembly including first and second pillows;

said first pillow having a perimeter formed by a left portion of said upper horizontal stitch line, said central major portion of said left vertical stitch line, a left portion of said lower horizontal stitch line, and a central major portion of said vertical left side outer edge;

said second pillow having a perimeter formed by a right portion of said upper horizontal stitch line, a central major portion of said vertical right side outer edge, a right portion of said lower horizontal stitch line, and said central major portion of said right vertical stitch line;

said first pillow has a central elongated vertical first axis;

said second pillow has a central elongated vertical second axis;

said first axis of said first pillow is equal in length to said second vertical axis of said second pillow;

with the exception of said equal lengths of first vertical axis and second vertical axis, all remaining dimensions of said first pillow are less than all corresponding dimensions of said second pillow;

said first pillow is surrounded on three, and only three, of its sides with substantially flat portions of said one-piece substantially square-shaped main fabric assembly; and said second pillow is surrounded on three, and only three, of its sides with substantially flat portions of said one-piece substantially square-shaped main fabric assembly.

4. A seat comfort device according to claim 3, wherein:

said seat comfort device is designed, dimensioned and shaped to be placed between an automobile seat and the back of a user of said seat comfort device;

said seat comfort device is designed to be oriented so that an upper portion of said first and second pillows is disposed adjacent an upper portion of an automobile seatbelt;

said first and second pillows are designed, dimensioned, and shaped so as not to interfere with the operation of said automobile seatbelt;

said seat comfort device is adapted to be rolled up for storage when not in use; and said seat comfort device is reversible for left or right side use relative to the automobile seat.

5. A seat comfort device, comprising:

a one-piece substantially square-shaped main fabric assembly having a top horizontal outer edge, a vertical right side outer edge, a bottom horizontal outer edge, and a vertical left side outer edge;

an upper horizontal stitch line disposed on said one-piece substantially square-shaped main fabric assembly and disposed parallel to and commensurate with said top horizontal outer edge at a predetermined distance from said top horizontal outer edge;

a first substantially flat rectangular portion of said one-piece substantially square-shaped main fabric assembly having a perimeter formed by said top horizontal outer edge, an upper portion of said vertical right side outer edge, said upper horizontal stitch line, and an upper portion of said vertical left side outer edge;

a lower horizontal stitch line disposed on said one-piece substantially square-shaped main fabric assembly and disposed parallel to and commensurate with said bottom horizontal outer edge at a predetermined distance from said bottom horizontal outer edge;

a second substantially flat rectangular portion of said one-piece substantially square-shaped main fabric assembly having a perimeter formed by said lower horizontal stitch line, a lower portion of said vertical right side outer edge, said bottom horizontal outer edge, and a lower portion of said vertical left side outer edge;

a left vertical stitch line disposed on said one-piece substantially square-shaped main fabric assembly and disposed parallel to and commensurate with said vertical left side outer edge at a predetermined distance from said vertical left side outer edge;

a right vertical stitch line disposed on said one-piece substantially square-shaped main fabric assembly and disposed parallel to and commensurate with said vertical right side outer edge at a predetermined distance from said vertical right outer edge;

a substantially rectangular-shaped substantially flat central portion of said one-piece substantially square-shaped main fabric having a perimeter formed by a central major portion of said upper horizontal stitch line, a central major portion of said right vertical stitch line, a central major portion of said lower horizontal stitch line, and a central major portion of said left vertical stitch line;

said one-piece substantially square-shaped main fabric assembly including first and second pillows;

said first pillow having a perimeter formed by a left portion of said upper horizontal stitch line, said central major portion of said left vertical stitch line, a left portion of said lower horizontal stitch line, and a central major portion of said vertical left side outer edge;

said second pillow having a perimeter formed by a right portion of said upper horizontal stitch line, a central major portion of said vertical right side outer edge, a right portion of said lower horizontal stitch line, and said central major portion of said right vertical stitch line;

said one-piece substantially square-shaped main fabric assembly is provided with a first substantially flat corner area disposed in a top left corner portion of said one-piece substantially square-shaped main fabric assembly, a second substantially flat corner area disposed in a top right corner portion of said one-piece substantially square-shaped main fabric assembly, a third substantially flat corner area disposed in a bottom right corner portion of said one-piece substantially square-shaped main fabric assembly, and a fourth substantially flat corner area disposed in a bottom left corner portion of said one-piece substantially square-shaped main fabric assembly;

said first pillow is surrounded on three, and only three, of its sides with substantially flat portions of said one-piece substantially square-shaped main fabric assembly; and said second pillow is surrounded on three, and only three, of its sides with substantially flat portions of said one-piece substantially square-shaped main fabric assembly.

6. A seat comfort device according to claim 5, wherein:

said seat comfort device is designed, dimensioned and shaped to be placed between an automobile seat and the back of a user of said seat comfort device;

said seat comfort device is designed to be oriented so that an upper portion of said first and second pillows is disposed adjacent an upper portion of an automobile seatbelt;

said first and second pillows are designed, dimensioned, and shaped so as not to interfere with the operation of said automobile seatbelt;

said seat comfort device is adapted to be rolled up for storage when not in use; and said seat comfort device is reversible for left or right side use relative to the automobile seat.

7. A seat comfort device, comprising:

a one-piece substantially square-shaped main fabric assembly having a top horizontal outer edge, a vertical right side outer edge, a bottom horizontal outer edge, and a vertical left side outer edge;

an upper horizontal stitch line disposed on said one-piece substantially square-shaped main fabric assembly and disposed parallel to and commensurate with said top horizontal outer edge at a predetermined distance from said top horizontal outer edge;

a first substantially flat rectangular portion of said one-piece substantially square-shaped main fabric assembly having a perimeter formed by said top horizontal outer edge, an upper portion of said vertical right side outer edge, said upper horizontal stitch line, and an upper portion of said vertical left side outer edge;

a lower horizontal stitch line disposed on said one-piece substantially square-shaped main fabric assembly and disposed parallel to and commensurate with said bottom horizontal outer edge at a predetermined distance from said bottom horizontal outer edge;

a second substantially flat rectangular portion of said one-piece substantially square-shaped main fabric assembly having a perimeter formed by said lower horizontal stitch line, a lower portion of said vertical right side outer edge, said bottom horizontal outer edge, and a lower portion of said vertical left side outer edge;

a left vertical stitch line disposed on said one-piece substantially square-shaped main fabric assembly and disposed parallel to and commensurate with said vertical left side outer edge at a predetermined distance from said vertical left side outer edge;

a right vertical stitch line disposed on said one-piece substantially square-shaped main fabric assembly and disposed parallel to and commensurate with said vertical right side outer edge at a predetermined distance from said vertical right outer edge;

a substantially rectangular-shaped substantially flat central portion of said one-piece substantially square-shaped main fabric having a perimeter formed by a central major portion of said upper horizontal stitch line, a central major portion of said right vertical stitch line, a central major portion of said lower horizontal stitch line, and a central major portion of said left vertical stitch line;

said one-piece substantially square-shaped main fabric assembly including first and second pillows;

said first pillow having a perimeter formed by a left portion of said upper horizontal stitch line, said central major portion of said left vertical stitch line, a left portion of said lower horizontal stitch line, and a central major portion of said vertical left side outer edge;

said second pillow having a perimeter formed by a right portion of said upper horizontal stitch line, a central major portion of said vertical right side outer edge, a right portion of said lower horizontal stitch line, and said central major portion of said right vertical stitch line;

said first pillow has a central elongated vertical first axis;

said second pillow has a central elongated vertical second axis;

said first axis of said first pillow is equal in length to said second vertical axis of said second pillow;

with the exception of said equal lengths of first vertical axis and second vertical axis, all remaining dimensions of said first pillow are less than all corresponding dimensions of said second pillow;

said one-piece substantially square-shaped main fabric assembly is provided with a first substantially flat corner area disposed in a top left corner portion of said one-piece substantially square-shaped main fabric assembly, a second substantially flat corner area disposed in a top right corner portion of said one-piece substantially square-shaped main fabric assembly, a third substantially flat corner area disposed in a bottom right corner portion of said one-piece substantially square-shaped main fabric assembly, and a fourth substantially flat corner area disposed in a bottom left corner portion of said one-piece substantially square-shaped main fabric assembly;

said first pillow is surrounded on three, and only three, of its sides with substantially flat portions of said one-piece substantially square-shaped main fabric assembly; and said second pillow is surrounded on three, and only three, of its sides with substantially flat portions of said one-piece substantially square-shaped main fabric assembly.

8. A seat comfort device according to claim 7, wherein:

said seat comfort device is designed, dimensioned and shaped to be placed between an automobile seat and the back of a user of said seat comfort device;

said seat comfort device is designed to be oriented so that an upper portion of said first and second pillows is disposed adjacent an upper portion of an automobile seatbelt;

said first and second pillows are designed, dimensioned, and shaped so as not to interfere with the operation of said automobile seatbelt;

said seat comfort device is adapted to be rolled up for storage when not in use; and said seat comfort device is reversible for left or right side use relative to the automobile seat.

\* \* \* \* \*